US009886213B2

(12) United States Patent
Sivasubramanian et al.

(10) Patent No.: US 9,886,213 B2
(45) Date of Patent: *Feb. 6, 2018

(54) SYSTEM AND METHOD FOR PROVIDING FLEXIBLE STORAGE AND RETRIEVAL OF SNAPSHOT ARCHIVES

(71) Applicant: Amazon Technologies, Inc., Seattle, WA (US)

(72) Inventors: Swaminathan Sivasubramanian, Sammamish, WA (US); Bradley Eugene Marshall, Bainbridge Island, WA (US); Tate Andrew Certain, Seattle, WA (US); Nicholas J. Maniscalco, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,545

(22) Filed: Apr. 4, 2016

(65) Prior Publication Data
US 2016/0216896 A1 Jul. 28, 2016

Related U.S. Application Data

(63) Continuation of application No. 12/892,735, filed on Sep. 28, 2010, now Pat. No. 9,304,867.

(51) Int. Cl.
G06F 12/00 (2006.01)
G06F 3/06 (2006.01)
(Continued)

(52) U.S. Cl.
CPC .............. *G06F 3/065* (2013.01); *G06F 3/064* (2013.01); *G06F 3/0619* (2013.01);
(Continued)

(58) Field of Classification Search
CPC ........... G06F 11/1456; G06F 2201/815; G06F 2201/84
See application file for complete search history.

(56) References Cited

U.S. PATENT DOCUMENTS 5,574,878 A 11/1996 Onodera et al.
6,269,431 B1 7/2001 Dunham
(Continued)

FOREIGN PATENT DOCUMENTS

WO 2004053696 6/2004
WO 2011/088261 7/2011

OTHER PUBLICATIONS

Office from Canadian Patent No. 2,812,912 (PCT/US2011/051221), Amazon Technologies, Inc., dated Oct. 2, 2015, pp. 1-3.
(Continued)

*Primary Examiner* — Mark Giardino, Jr.
(74) *Attorney, Agent, or Firm* — Robert C. Kowert; Meyertons, Hood, Kivlin, Kowert & Goetzel, P.C.

(57) ABSTRACT

A group of computers is configured to implement a block storage service. The block storage service includes a block-level storage for storing data from a set of distinct computing instances for a set of distinct users. An interface is configured to allow the set of distinct users to specify respective destinations for storing backup copies of respective data stored in the block-level storage for the distinct users. At least some of the respective destinations are for different storage systems remote from one another. A backup copy function is provided for creating backup copies of data stored in the block-level storage by the set of distinct computing instances for the set of distinct users. The backup copies are stored in different destination locations specified by respective ones of the plurality of distinct users via the interface.

20 Claims, 11 Drawing Sheets

(51) Int. Cl.
*G06F 11/14* (2006.01)
*G06F 13/00* (2006.01)
*G06F 13/28* (2006.01)

(52) U.S. Cl.
CPC ........ *G06F 3/0673* (2013.01); *G06F 11/1456* (2013.01); *G06F 2201/815* (2013.01); *G06F 2201/84* (2013.01)

(56) References Cited

U.S. PATENT DOCUMENTS

| | | |
|---|---|---|
| 6,463,509 B1 | 10/2002 | Teoman et al. |
| 7,487,219 B1 | 2/2009 | Jia et al. |
| 7,536,424 B2 | 5/2009 | Barzilai et al. |
| 7,546,323 B1 | 6/2009 | Timmins et al. |
| 7,895,261 B2 | 2/2011 | Jones et al. |
| 8,280,853 B1 | 10/2012 | Lai et al. |
| 8,285,687 B2 | 10/2012 | Voll et al. |
| 8,392,612 B2 | 3/2013 | Simon et al. |
| 9,304,867 B2 | 4/2016 | Sivasubramanian et al. |
| 2002/0059253 A1 | 5/2002 | Albazz et al. |
| 2003/0191930 A1 | 10/2003 | Viljoen et al. |
| 2004/0078419 A1 | 4/2004 | Ferrari et al. |
| 2004/0260873 A1 | 12/2004 | Watanabe |
| 2005/0125467 A1 | 6/2005 | Oosaki et al. |
| 2007/0083356 A1 | 4/2007 | Brunet et al. |
| 2008/0140905 A1 | 6/2008 | Okuyama |
| 2009/0228889 A1 | 9/2009 | Yoshida |
| 2009/0249470 A1 | 10/2009 | Litvin et al. |
| 2010/0011178 A1 | 1/2010 | Feathergill |
| 2010/0037009 A1 | 2/2010 | Yano et al. |
| 2010/0049930 A1 | 2/2010 | Pershin et al. |
| 2010/0070725 A1 | 3/2010 | Prahlad et al. |
| 2010/0191922 A1 | 7/2010 | Dickey et al. |
| 2010/0312983 A1 | 12/2010 | Moon et al. |
| 2011/0246427 A1 | 10/2011 | Modak et al. |
| 2012/0060006 A1 | 3/2012 | Paterson-Jones et al. |
| 2012/0254687 A1 | 10/2012 | Leggette et al. |
| 2012/0284712 A1 | 11/2012 | Nimmagadda et al. |
| 2013/0046966 A1 | 2/2013 | Chu et al. |

OTHER PUBLICATIONS

Extended European Search Report for Application No. PCT/US2011/051221, dated Feb. 12, 2015, Amazon Technologies, Inc., pp. 1-11.
Office Action from Japanese Application No. 2013531617, dated Dec. 2, 2014, English and Japanese versions, pp. 1-4.
Atsushi Nakata, "Close Up", Nikkei Computer, 2008, pp. 1-9E.
VMware; Carl Waldspurger; Memory Resource Management in WMware ESX Server; pp. 1-24, Dec. 10, 2002.
HP; Chris Hyser et al.; Autonomic Virtual Machine Placement in the Data Center; pp. 1-10, Feb. 26, 2008; HP Laboratories.
U.S. Appl. No. 12/892,742, filed Sep. 28, 2010, Swaminathan Sivasubramanian.
"Amazon EBS API and Command Overview", downloaded Jul. 11, 2013 from doc.aws.amazon.com/AWSEC2/latest/UserGuide/ebs-api-cli-overview.html, p. 1.
"AMI Basics" downloaded Jul. 11, 2013 from doc.aws.amazon.com/AWSEC2/latest/UserGuide/ComponentsAMIs.html, p. 1-2.
"AWS Amazon Elastic Block Store {EBS}—Persistent Storage" downloaded Jul. 11, 2013 from aws.amazon.com/ebs/, pp. 1-4.
"Cloudiquity" Published Mar. 12, 2009, Amazon Web Services and Cloud, pp. 1-4.
"Feature Guide: Elastic Block Store: Articles & Tutorials: Amazon Web Services" downloaded Jul. 11, 2013 from aws.amazon.com/articles/1667, pp. 1-7.
U.S. Appl. No. 14/028,186, filed Sep. 16, 2013, Marcin Piotr Kowalski.
U.S. Appl. No. 13/465,998, filed May 7, 2012, Marc J. Brooker.
U.S. Appl. No. 13/424,290, filed Mar. 19, 2012, Marc J. Brooker.
U.S. Appl. No. 13/466,007, filed May 7, 2012, Marc J. Brooker.
U.S. Appl. No. 13/466,010, filed May 7, 2012, Marc J. Brooker.
U.S. Appl. No. 13/466,014, filed May 7, 2012, Marc J. Brooker.
U.S. Appl. No. 13/466,022, filed May 7, 2012, Marc J. Brooker.
Office Action from Japanese Application No. 2013-531617, dated Jan. 7, 2014, English and Japanese versions, pp. 1-3.
International Search Report and Written Opinion from PCT/US 11/51221, dated Jan. 23, 2012, Amazon Technologies, Inc., pp. 11.

SYSTEM AND METHOD FOR PROVIDING FLEXIBLE STORAGE AND RETRIEVAL OF SNAPSHOT ARCHIVES

This application is a continuation of U.S. patent application Ser. No. 12/892,735, filed Sep. 28, 2010, now U.S. Pat. No. 9,304,867, which is hereby incorporated by reference herein in its entirety.

BACKGROUND

The recent revolution in technologies for dynamically sharing virtualizations of hardware resources, software, and information storage across networks has increased the reliability, scalability, and cost efficiency of computing. More specifically, the ability to provide virtual computing resources on demand through the advent of virtualization has enabled consumers of processing resources to flexibly structure their computing costs in response to immediately perceived computing needs. Such virtualizations allow customers to purchase processor cycles and related resources at the instant of demand, rather than buying or leasing fixed hardware in provisioning cycles that are dictated by the delays and costs of manufacture and deployment of hardware. Rather than depending on the accuracy of predictions of future demand to determine the availability of computing, users are able to purchase the use of computing resources on a relatively instantaneous as-needed basis.

In virtualized environments that provide computing resources on demand, however, difficulties and inflexibility still exist in the importation of data to and exportation of data from virtualized computing systems, such as in backup operations. Current solutions for importing and exporting large segments of data consist of cumbersome work-arounds that have proven frustratingly slow and unreliable. While access to computing power has become more flexible, the methods available to bring data to the computing process and export data from the computing process have not advanced to a satisfactory state.

Figure 1:
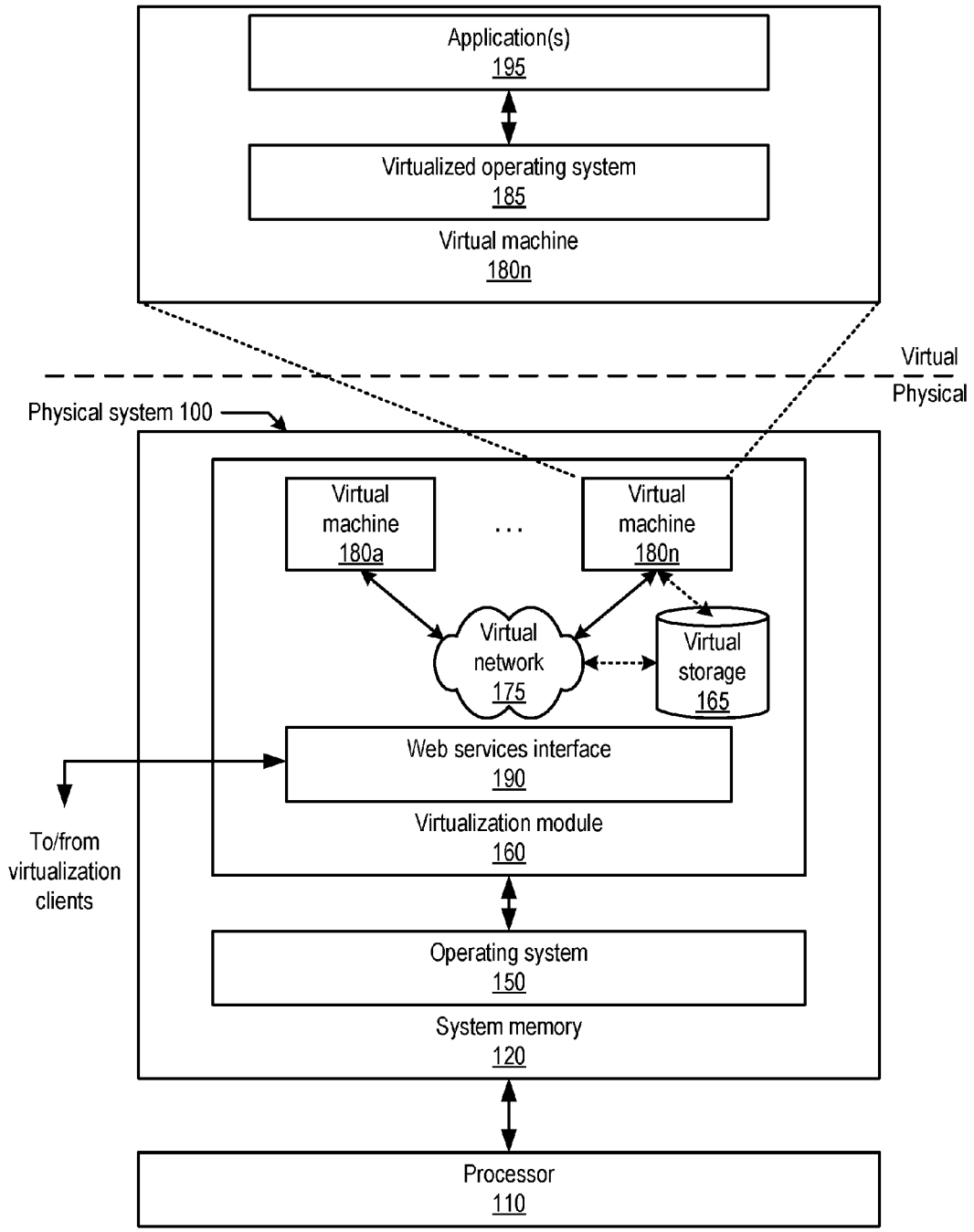
FIG. 1 illustrates an example embodiment of a system that may be configured to implement virtualized computing.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Introduction

In an environment providing on-demand storage associated with a cloud computing service or other virtualized computing, a block storage service provides block-level storage to a set of distinct computing instances for a set of distinct users. The computing instances need not be co-resident with either the block-level storage or one another. Embodiments provide both a backup copy function for creating backup copies of data stored in the block-level storage by the set of distinct computing instances for the set of distinct users and a storage function for storing the backup copies in different destination locations specified by respective ones of the set of distinct users.

Embodiments thus help to alleviate the difficulties previously associated with exporting data from the block-level storage used by the distinct computing instances of a cloud computing service. Embodiments provide the flexibility to route backup copies of data from the block level storage to multiple storage destinations. In some embodiments, the multiple storage locations are remote from the block-level storage and from one another. In one embodiment, the block storage service receives input from a particular one of the set of distinct users specifying a particular destination for storing a backup copy of at least a portion of data stored in the block-level storage for the particular one of the set of distinct users. The block storage service creates the backup copy of the portion of data stored in the block-level storage for the particular one of the plurality of distinct users and stores to the particular destination the backup copy of the portion of data stored in the block-level storage for the particular one of the set of distinct users.

Similarly, in response to the block storage service receiving input from another one of the set of distinct users specifying a different destination for storing a backup copy of a portion of data stored in the block-level storage for the another one of the set of distinct users, the block storage service creates the backup copy of the portion of data stored in the block-level storage for the another one of the set of distinct users and stores to the different destination the backup copy of the portion of data stored in the block-level storage for the another one of the set of distinct users. In some embodiments, the particular destination and the different destination are different storage systems remote from one another.

Overview of Virtualized Computing

Generally speaking, virtualized computing (which may also be referred to as virtual computing or virtualization)

may refer to techniques for configuring a physical computer system so that it appears, from a software perspective, to behave like multiple independent "virtual" computer systems. Virtualized computing may be distinguished from a conventional multitasking operating system (OS). A typical OS may provide a number of protected memory spaces in which different processes may execute without interfering with one another, as well as a common set of privileged routines to manage execution of those processes and coordinate access to system resources. By contrast, virtualized computing techniques may be employed to configure multiple virtual machines, each of which may execute its own operating system, which may be different for different virtual machines. Access to these machines may then be distributed to different users over a network.

By decoupling the configuration and operation of a virtual machine from the underlying physical hardware on which the virtual machine executes, virtualized computing may enable a user to configure a virtual machine according to a defined set of specifications, and to recreate the previously configured virtual machine at a later time, all without altering the configuration of the underlying physical hardware. Embodiments discussed below allow, among other uses of an importable snapshot, the importation of a snapshot image to for use in recreating a volume used by a virtual machine.

An example of a system that may be configured to implement virtualized computing is illustrated in FIG. 1. In the illustrated embodiment, physical system 100 includes a processor 110 coupled to a system memory 120. For example, processor 110 may correspond to any type of microprocessor configured to execute instructions defined by a particular instruction set architecture (ISA), such as the x86/x64 ISA, the PowerPC™ ISA, the SPARC™ ISA, the ARM™ ISA, or any other suitable ISA. System memory 120 may correspond to any type of storage device configured to store data and instructions executable by processor 110. For example, system memory 120 may include any of various types of random access memory (RAM), read-only memory (ROM), non-volatile memory (e.g., flash memory), magnetic memory, or any other suitable type of memory.

System memory 120 may be configured to store instructions and data that, when executed by processor 110 or another processor, are configured to implement an operating system 150 and virtualization module 160. Generally speaking, operating system 150 may correspond to any suitable type of operating system, such as a version of Microsoft Windows™, Apple MacOS™, Unix, Linux, or another operating system. Typically, operating system 150 may be configured to serve as an interface between applications and the resources provided by the computer system, such as memory, mass storage devices, communications devices, system services, and the like.

Virtualization module 160 may be configured to implement an environment within which multiple different virtual machines may operate. Virtualization module 160 may also be referred to as a hypervisor or a virtual machine monitor. In the illustrated embodiment, virtualization module 160 may be implemented as a distinct layer of software from operating system 150, a configuration that may be referred to as a "hosted hypervisor." In other embodiments, rather than running in a distinct layer, virtualization module 160 may be integrated with operating system 150 in a configuration that may be referred to as a "native hypervisor." Some examples of hosted-hypervisor implementations of virtualization module 160 may include VMware ESX/ESXi™ VMware Fusion™, Microsoft Virtual PC™, VirtualBox™, and Parallels Desktop™ Some examples of native-hypervisor implementations may include Xen, VMware Infrastructure™, Logical Domains Hypervisor™, and Parallels Server™. Other examples are possible and contemplated.

In the illustrated embodiment, virtualization module 160 is configured to implement a number of virtual machines 180a-n, as well as a virtual network 175, virtual storage 165, and a web services interface 190. Examples of each of these elements will be discussed in turn, it being noted that numerous variations and alternative configurations are possible. In various embodiments, various elements may be referred to using alternative terminology. For example, individual virtual machines 180 may correspond to "instances," and the state of various virtual machines 180 (e.g., their applications, data, and configuration) may correspond to "Machine Images" or MIs. These instances can support distinct users.

It is noted that processes that implement various virtualized elements such as virtual machines 180, virtual network 175, and virtual storage 165 may be configured to execute on different physical hardware than virtualization module 160 itself. For example, virtualization module 160 may be configured to employ remote procedure calls or other techniques to cause a process or thread corresponding to a particular virtual machine 180, or any other virtualized element, to be executed on a different physical system that possibly may have a different configuration than physical system 100.

Any number of virtual machines 180 may be deployed, depending on the resource capabilities of the underlying physical system 100 as well as virtualization module 160. Generally speaking, each of virtual machines 180 may be configured to host its own copy of an operating system and applications, which may execute independently of the other virtual machines 180. For example, FIG. 1 illustrates virtual machine 180n as including a virtual operating system 185 as well as one or more applications 195. Virtual operating system 185 may correspond to any suitable operating system, which may include any of the types of operating systems mentioned above with respect to operating system 150. Virtual operating system 185 may also be distinct from the underlying operating system 150 that executes on physical computer system 100. For example, virtual operating system 185 and operating system 150 may be completely different operating systems. Alternatively, they may correspond to the same type of operating system, but may each have distinct copies of data structures and/or executable code, and may be configured to execute separately from one another.

Each virtual machine 180 may be configured to operate as though it were an independent physical machine possessing those resources of physical system 100 that have been allocated to the virtual machine 180. For example, virtual machine 180a may be configured to execute a version of Microsoft Windows™ and one or more Windows applications, while virtual machine 180n may be configured to execute a version of Linux and one or more Linux applications. In some embodiments, the operating systems and applications executing on a given virtual machine 180 may be incapable of discerning that they are running in a virtual rather than a physical system. Thus, virtualization may be performed transparently with respect to each virtual machine 180.

In various embodiments, virtualization module 160 may be configured to cause virtual machines 180a-n to be instantiated and destroyed in response to configuration requests received by virtualization module 160, e.g., from clients that may be external to physical system 100. The client may correspond to a process executing on behalf of a user, either on physical system 100 or on a different system configured to communicate with physical system 100, e.g., via a network.

In various embodiments, the client's request may include configuration parameters for the requested given virtual machine 180. For example, the client may specify particular resources for the given virtual machine 180, such as an amount of memory, a particular level of processor performance, or the like. Alternatively, the client may specify a particular type or class of virtual machine 180 from among a set of available configurations. For example, virtualization module 160 may present generic "small," "medium," "large," and/or other types of virtual machine configurations for selection by the client, each having defined memory, performance, and/or other characteristics. In some embodiments, these characteristics may include a destination location or destination locations for storing backup copies of portions of virtual storage 165 or other data structures associated with a virtual machine 180. In some embodiments, these characteristics may include a source location or source locations for retrieving backup copies of portions of virtual storage 165 or other data structures associated with a virtual machine 180. Such source and destination locations can be locally hosted within physical system 100 or accessed remotely, e.g., via a network.

In some embodiments, the client's request may also include information regarding how the state of the given virtual machine 180 should be initialized. For example, the request may specify the operating system 185 that should be booted, the application(s) 195 that should be available, and/or any data, libraries, or other inputs that may be needed to perform the client's computation. In various embodiments, the client may select an initialization state from a number of options (e.g., may select from a list of available operating systems), may provide a detailed memory image reflecting the desired initial state of the given virtual machine 180 (e.g., reflecting executable code and/or data), or a combination of these or other techniques. In various embodiments, the initial state may be retrieved from a backup copy stored at an importation location or importation locations for storing backup copies of portions of virtual storage 165 or other data structures associated with a virtual machine 180.

In response to a request to create or initialize a given virtual machine 180, virtualization module 160 may be configured to allocate resources of physical system 100 to the given virtual machine 180, such as by setting aside a certain amount of system memory 120 to be used by the given virtual machine 180 as its own virtual system memory. Virtualization module 160 may also initialize the given virtual machine 180. For example, the given virtual machine 180 may be initialized according to the client's specification, or to a default state.

Once configured and initialized (which may occur concurrently or as part of the same operation), given virtual machine 180 may then begin operating. For example, operating system 185 may boot or resume from a previously defined state. Application(s) 195 may execute, either in an interactive fashion (i.e., receiving input from the client during operation) or autonomously. In various embodiments, as described below, virtualization module 160 may provide given virtual machine 180 with access to storage as well as a virtual network that may allow given virtual machine 180 to communicate with other virtual machines 180.

At some point, a request to terminate given virtual machine 180 may occur. For example, a client may initiate such a request when the task for which given virtual machine 180 was configured has completed, or for some other reason. Alternatively, virtualization module 160 may initiate such a request, for example in the event that the machine becomes unstable or violates some aspect of the client's terms of use. In response, given virtual machine 180 may be terminated and its resources freed for use by other virtual machines. For example, virtualization module 160 may attempt to perform an orderly shutdown of given virtual machine 180 if possible. Virtualization module 160 may archive or otherwise preserve the state of given virtual machine 180, information about its configuration within the virtual computing environment, and/or any other salient information. Once these or any other housekeeping tasks have completed, given virtual machine 180 may cease to exist as an entity.

In addition to providing for the configuration and operation of virtual machines 180, virtualization module 160 may be configured to provide for virtualized network connectivity among virtual machines 180 via virtual network 175. For example, virtual network 175 may be configured to emulate a local area network (LAN) or any other suitable type or topology of network. Through virtual network 175, virtual machines 180 may be configured to communicate with one another as though they were physical machines connected to a physical network.

In some embodiments, virtualization module 160 may be configured to bridge virtual networks implemented on different physical systems in order to implement virtual networks of large scale. For example, virtual machines 180 implemented on distinct physical systems 100 may nonetheless be able to communicate with one another as part of the same general virtual network 175. In such embodiments, different instances of virtualization module 160 may be configured to communicate information with one another via a physical network connecting their respective physical systems 100 in order to implement virtual network communication among their virtual machines 180.

Virtualization module 160 may also be configured to provide virtual machines 180 with access to mass storage, shown as virtual storage 165. For example, virtual storage 165 may be configured as a block storage device (e.g., a logical storage volume), a file system, a database, or any other suitable type of mass storage that may be presented to a computer system. Embodiments of virtual storage 165 may also be referred to generically as mass storage resources. In some embodiments, virtual storage 165 may be implemented as a virtual network-connected device accessible to virtual machines 180 via virtual network 175. For example, virtual storage 165 may be configured as a virtualized network attached storage (NAS) device, as a virtualized storage area network (SAN), as a storage service accessible through Internet protocols (e.g., as a web-services-based storage service), or in any other suitable fashion. In some embodiments, virtual storage 165 may be implemented via a service, either locally implemented or remotely accessible across a network.

In some embodiments, management of virtual storage 165 may be handled by virtualization module 160 directly. For example, virtualization module 160 may include the functionality necessary to implement a virtualized volume server, file server, or other type of mass storage architecture. In other embodiments, virtualization module 160 may instead provide interfaces through which virtual machines 180 may access storage that exists and is managed externally to virtualization module 160. For example, some other software component executing on physical system 100 or another system may be configured to provide mass storage as well as an application programming interface (API) through which to access storage. Virtualization module 160 may then be configured to pass storage access requests from virtual machines 180 to this external API.

Virtualization module 160 may be configured to support a number of different types of interfaces through which a client may interact with a particular virtual machine 180. For example, virtualization module 160 may be configured to perform basic terminal emulation to allow a client to provide textual input to virtual machines 180 and to return textual output for display to the client. In cases where a given virtual machine 180 supports more sophisticated user interfaces, such as windowing systems or other types of graphical user interfaces (GUIs) that may be hosted by software executing within given virtual machine 180, virtualization module 160 may be configured to pass input from the client's input devices (e.g., keyboard, pointing device, etc.) to given virtual machine 180 and to pass graphical output to the client.

In some embodiments, virtualized computing may be offered as an on-demand, paid service to clients. For example, an enterprise may assemble and maintain the various hardware and software components used to implement virtualized computing, and may offer clients access to these resources according to various pricing models (e.g., usage-based pricing, subscription pricing, etc.). Thus, clients may have access to a range of virtual computing resources without having to incur the costs of provisioning and maintaining the infrastructure needed to implement those resources. Generally speaking, to provide virtualized computing services to clients, virtualization module 160 may be configured to present a virtualized computing service API to clients, through which the clients may submit various types of requests for virtualized computing services. For example, as described in greater detail below, clients may submit requests via the virtualized computing service API for virtualized computing resources to be instantiated, initialized, and/or deleted. Clients may also submit requests for various computations to be performed by virtualized computing resources.

In the embodiment illustrated in FIG. 1, virtualization module 160 may be configured to present virtualized computing resources such as virtual machines 180 to clients as part of a web service via web services interface 190. Generally speaking, a web service may refer to computing functionality that is made available to clients through calls made by clients to one or more web services endpoints, where the web services endpoints are addressable by the clients according to an application-level, Internet-based transport protocol, such as the Hypertext Transfer Protocol (HTTP). For example, a web services endpoint may implement a particular API that defines the web services operations that clients may request. In some embodiments, web services interface 190 may be configured to implement the addressable web services endpoint(s), and may include functionality configured to receive and send web services request and response information with respect to clients.

To request that the web service perform a particular operation, clients may format the request in the manner specified by the API and convey the request to the addressable endpoint. For example, the endpoint may be addressable according to a Uniform Resource Indicator (URI) of the form "endpoint.domainname.toplevel" such as, e.g., virtualcomputing.company.com. Alternatively, the endpoint may be addressable according to a numeric-form address such as, e.g., an IP address.

In various embodiments, web services interface 190 may be configured to be invoked by clients in any of a number of suitable ways. For example, web services interface 190 may be configured to implement a Representational State Transfer (REST)-style web services architecture. Generally speaking, in a REST architecture, the requested web services operation and its various parameters may be appended to the web services call that is made to the web services endpoint according to the transport protocol. For example, the details of the requested operation may be included as parameters of an HTTP request method such as GET, PUT, or POST. Alternatively, web services interface 190 may be configured to implement a document- or message-oriented architecture. For example, the details of the requested operation may be formatted by the client as an eXtensible Markup Language (XML) document and encapsulated using a version of the Simple Object Access Protocol (SOAP). Upon receiving such a document, web services interface 190 may be configured to extract the details of the requested web services operation and attempt to perform the operation.

In the context of virtualized computing as a web service, it is contemplated that the API implemented by web services interface 190 may support any or all of the types of operations made available to clients by virtualization module 160, including storage operations such as the execution of requests to make a backup copy of a volume or restore a volume from a backup copy. For example, the API may support the configuration, initialization, and termination of virtual machines 180 as discussed above. Additionally, in some embodiments, the API may support the exchange of input and output (textual, graphical, audio, or otherwise) between the client and virtual machines 180 or other virtualized resources.

Data Centers and Backup Storage

Figure 2A:
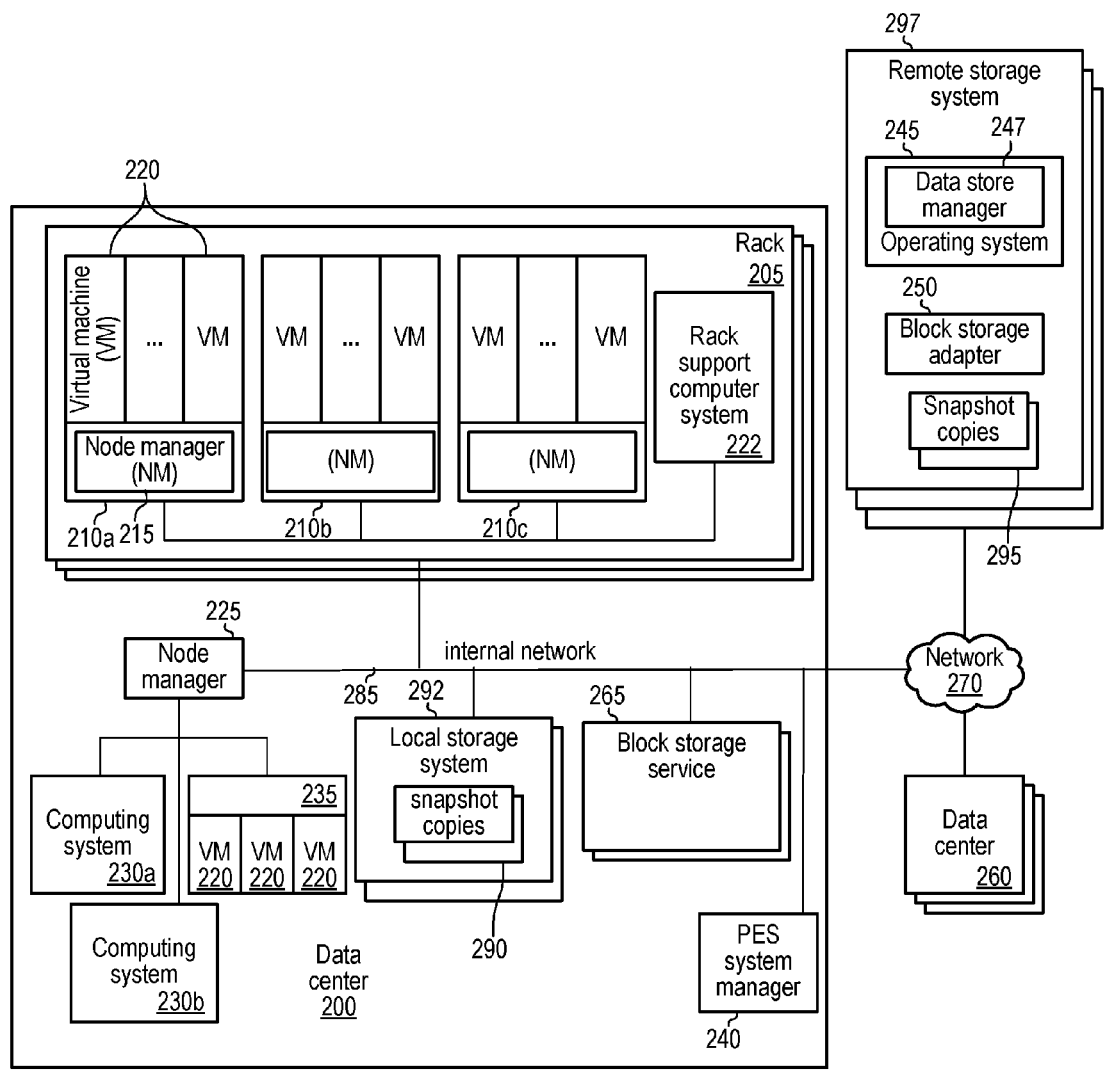
FIG. 2A illustrates a network diagram for an example embodiment in which multiple computing systems execute programs and access storage.

Referring now to FIG. 2A, a network diagram for an example embodiment in which multiple computing systems execute programs and access storage is depicted. A program execution service manages the execution of programs on various host computing systems located within a data center 200, and a block storage service works in conjunction with multiple other storage systems at the data center to provide block-level storage to those executing programs. Multiple remote and local storage systems are used to store additional copies, such as backup copies, of at least some portions of at least some block data storage volumes.

In this example embodiment, data center 200 includes a number of racks 205, and each rack includes a number of host computing systems, as well as an optional rack support computer system 222. Host computing systems 210*a-c* on the illustrated rack 205 each host one or more virtual machines 220, as well as a distinct node manager module 215 associated with the virtual machines on that host computing system. Node manager module 215 manages the virtual machines associated with the host computing system on which node manager module 215 resides. One or more other host computing systems 235 also each host one or more virtual machines 220 in this example. Each virtual machine 220 may act as an independent computing instance for executing one or more program copies (not shown) for a user (not shown), such as a customer of a program execution service accessed through a web services interface, such as the web services interface 190 discussed with respect to FIG. 1.

In addition, the example data center 200 of FIG. 2A includes host computing systems 230a-b that do not include distinct virtual machines, but may nonetheless each act as a computing node for one or more programs (not shown) being executed for a user. A node manager module 225 executing on a computing system (not shown) distinct from host computing systems 230a-b and 235 is associated with host computing systems 230a-b and 235 to manage computing nodes provided by those host computing systems, in a manner similar to the node manager modules 215 for host computing systems 210. Rack support computer system 222 may provide various utility services for other computing systems local to its rack 205 (e.g., long-term storage, metering and other monitoring of program execution and/or non-local block data storage access performed by other computing systems to the local rack, etc.), as well as possibly to other computer systems located in the data center. Each of computing system 210, 230, and 235 may also have one or more local attached storage devices (not shown), such as to store local copies of programs and/or data created by or otherwise used by the executing programs, a well as various other components.

An optional program execution service (PES) system manager 240 is also illustrated. PES system manager 240 is a computing system executing a PES system manager module to provide assistance in managing the execution of programs on the computing nodes provided by host computing systems 210, 230, and 235 (or, optionally, on computing systems (not shown) located within one or more other data centers 260, or other remote computing systems (not shown) available over a network 270. PES system manager 240 may provide a variety of services in addition to managing execution of programs, including the management of user accounts (e.g., creation, deletion, billing, collection of payment, etc.). PES system manager 240 may further provide the registration, storage and distribution of programs to be executed, as well as the collection and processing of performance and auditing data related to the execution of programs. In some embodiments, PES system manager 240 may coordinate with node manager modules 215 and 225 to manage program execution on computing nodes associated with node manager modules 215 and 225.

Data center 200 also includes a block storage service 265, which is discussed in greater detail below with respect to FIG. 2B, for providing block-level data storage to programs executing on computing nodes provided by host computing systems 210, 230, and 235 located within data center 200 or optionally computing systems (not shown) located within one or more other data centers 260, or other remote computing systems (not shown) available over a network 270.

In one embodiment, data center 200 communicates with a remote storage system 297, which includes an operating system 245 supporting a data store manager 247. Remote storage system 297 may be under the control of the same entity as local storage system 292 or under the control of a different entity. Data store manager receives and stores snapshot copies 295 from block storage service 265. In some embodiments, a block storage adapter 250 is executed within remote storage system 297 to facilitate communication with block storage service 265.

Figure 2B:
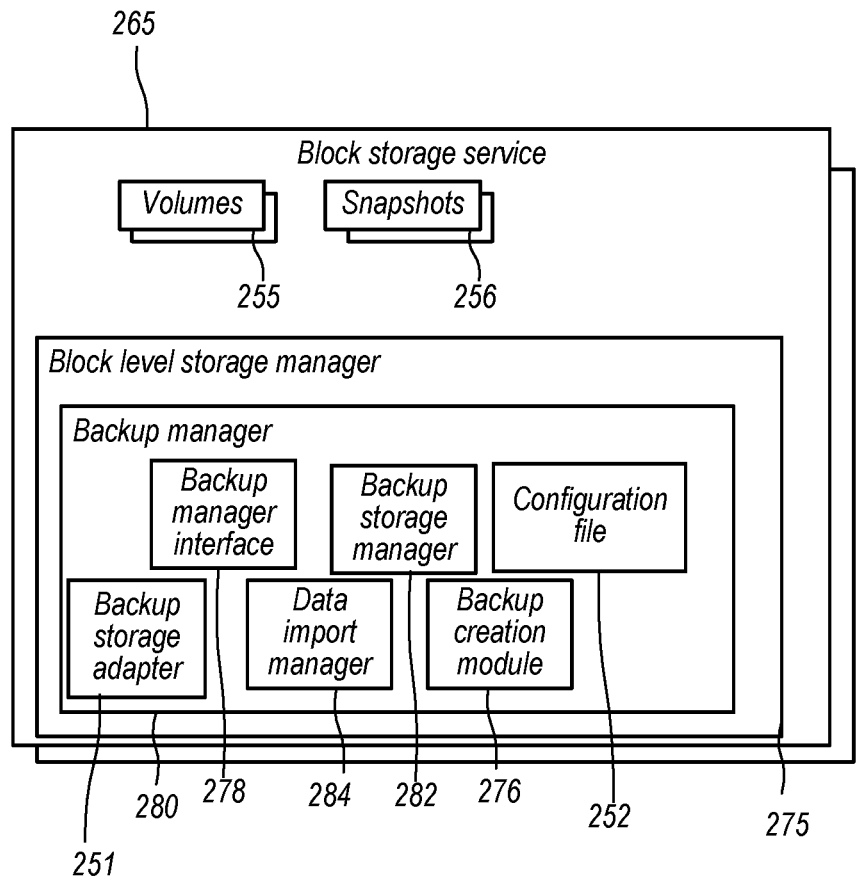
FIG. 2B illustrates a block storage service for performing storage operations according to one embodiment.

FIG. 2B illustrates a block storage service for performing storage operations according to one embodiment. Block storage service 265 is a storage system, composed of a pool of multiple server block data storage systems (omitted for simplicity), which provides block level storage for storing one or more volumes 255 and one or more snapshots 256. A snapshot 256 is a fixed point-in-time representation of the state of a volume 255. In some embodiments, snapshots are used for backup purposes. In other embodiments, snapshots are used for all manner of file operations to expedite the release of system resources for the performance of concurrent operations. Snapshots are further used in many operations in which duplicate sets of data are helpful in the execution of computing tasks. Block storage service 265 executes a block-level storage manager 275 to assist in the operation of block storage service 265. Specifically, and with reference again to FIG. 2A, block level storage manager 275 assists in managing the availability of block data storage to programs executing on computing nodes provided by host computing systems 210, 230, and 235 located within data center 200 or optionally computing systems (not shown) located within one or more other data centers 260, or other remote computing systems (not shown) available over a network 270. In the embodiment portrayed in FIG. 2A and FIG. 2B, access to volume copies 255 is provided over an internal network 285 to programs executing on nodes 210 and 235. Block level storage manager 275 may provide a variety of services related to providing block level storage functionality, including the management of user accounts (e.g., creation, deletion, billing, collection of payment, etc.). Block level storage manager 275 may further provide services related to the creation, usage and deletion of volumes 255 and snapshots 256 on block storage service 265. Block level storage manager 275 may also provide services related to the collection and processing of performance and auditing data related to the use of volume 255 and snapshots 256 of those volumes.

Returning to FIG. 2B, block level storage manager 275 also contains a backup manager 280. Backup manager 280 provides an interface for creating, storing, managing and importing snapshots 256 and other backup images of data stored in volumes 255 of block storage service 265. In one embodiment, backup manager module 280 stores snapshots to storage systems, such as snapshot copies 290 on local storage system 292 and snapshot copies 295 on remote storage system 297. Backup manager 280 may provide a variety of services related to providing backup storage functionality, including the management of user accounts (e.g., authorization, creation, deletion, billing, collection of payment, etc.). In one embodiment, backup manager 280 requires proof of authorization before allowing remote storage system 297 to become associated with a computing instance. Further, backup manager 280 may provide pricing-influenced selection, in which billing rates associated with performance particular operations on particular storage systems influence the choice of a storage system for the performance of a particular task. For example, backup manager 280 may be programmed to preferentially perform storage of snapshot copies 295 on remote storage system 297 over storage of snapshot copies 290 on local storage system 292 on the basis of higher prices associated with storage of snapshot copies 290 on local storage system 292.

Backup manager module 280 includes a backup manager interface 278 for receiving requests from computing instances or users of a web service interface, such as web services interface 190 of FIG. 1, requesting the performance of backup operations. Such requests will, in one embodiment, specify a destination, such as local storage systems 292 and other configuration parameters for storing snapshot copies 290 of at least a portion of data stored in volumes 255 of block-level storage provided by block storage service 265 for the user of a computing instance, such as one of virtual machines 220. Such requests may be embodied as API calls from a web services interface, such as web services interface

190 of FIG. 1. The requests can specify a storage location and a storage granularity or other parameters, as discussed below. Backup manager interface 278 is also configured to receive requests to restore volumes 255 in block storage service 265 from snapshots such as snapshot copies 295 or other backup copies on remote storage system 297 and snapshot copies 290 on local storage system 292.

A storage granularity refers to the number, frequency, size, or comprehensiveness of a backup or backup series requested to be created and stored at a particular location. At one setting of granularity, a full series of full-backup snapshots of a selected volume can be stored at a particular location. Alternatively, at another setting of granularity, portions of snapshots of a volume can be created and stored at a location. These portions of data can include a particular data structure, such as a file, or a block range defined to meet particular backup parameters (such as an arbitrary block scheme or only the block ranges where data has been modified since a last backup). Additionally, the ability to flexibly specify storage granularities includes the ability specify that a first snapshot representing a volume or a portion of a volume will be stored at a first storage location and that a second snapshot of the same volume or portion of a volume (or a different portion of the volume) will be routed to a second location. A configuration file 252 includes the details associated with performing various backup and restore operations. Such details can include the format of APIs associated with a particular storage system, the location of a storage system at a particular storage destination or importation location, or information specifying features of a backup such as backup granularity.

Backup manager module 280 further includes a backup creation module 276 for creating snapshots of volumes or portions of volumes as specified by the input received through backup manager interface 278. The backup manager module also includes a backup storage manager 282. Backup storage manager 282 performs the transmission and storage of snapshots, such as snapshot copies 290 in local storage system 292 or snapshot copies 295 in remote storage system 297. Backup storage manager 282 may be configured to communicate with local storage system 292 and remote storage system 297 using any of a wide variety of transport layer protocols (e.g., TCP, UDP, etc.) and application layer protocols (e.g., HTTP, FTP, XML-RPC, SOAP, etc.), which will vary from embodiment to embodiment. In some embodiments, backup storage manager 282 transmits snapshot copies 290 to local storage systems 292 across local network 285. Similarly, backup storage manager 282 transmits snapshot copies 295 to remote storage system 297 over network 270.

In some embodiments, backup storage manager 282 is configured to communicate directly with data store manager 247 using an API protocol for storage calls that is supported on both backup storage manager 282 and data store manager 247. In other embodiments, the API protocol for storage calls that is used by backup storage manager 282 is not directly supported on data store manager 247, and a block storage adapter 250 or a backup storage adapter 251 is used to facilitate the interoperability of data store manager 247 and backup storage manager 282. In some embodiments, different computing instances on the same host node will communicate with storage systems for different storage transactions using distinct API protocols. Backup manager 280 additionally includes a data import manager 284 for restoring or importing volumes or portions of volumes as received as snapshot copies 290 from local archival storage system 292 or snapshot copies 295 received from remote archival storage system 297.

Process Steps for Interacting with Backup Storage

Figure 3A:
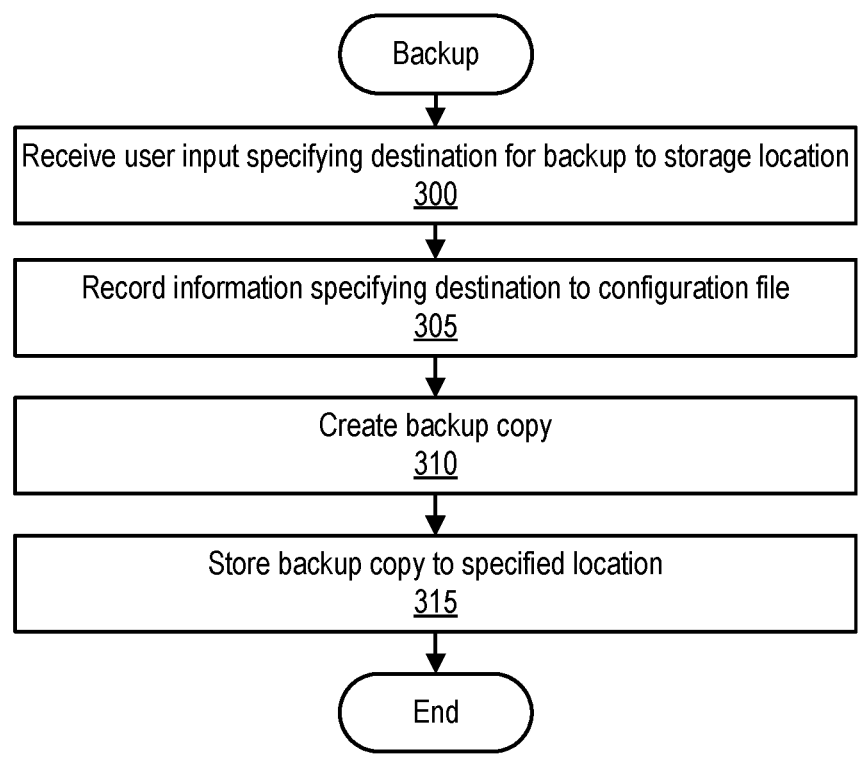
FIG. 3A is a high-level flowchart of process steps for creating and storing a backup copy of a volume according to one embodiment.
Figure 3B:
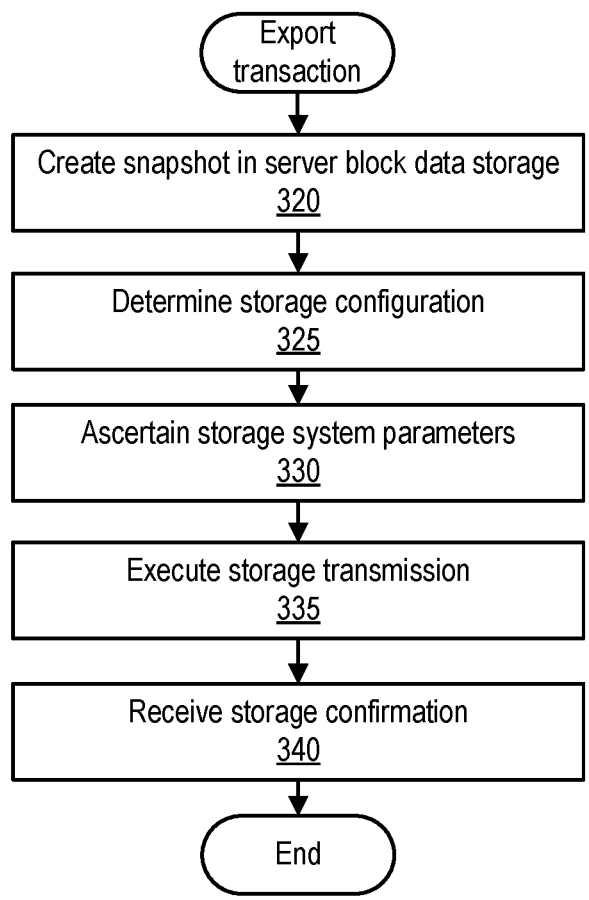
FIG. 3B is a high-level flowchart of process steps for creating and storing a backup copy of a volume according to one embodiment.
Figure 4:
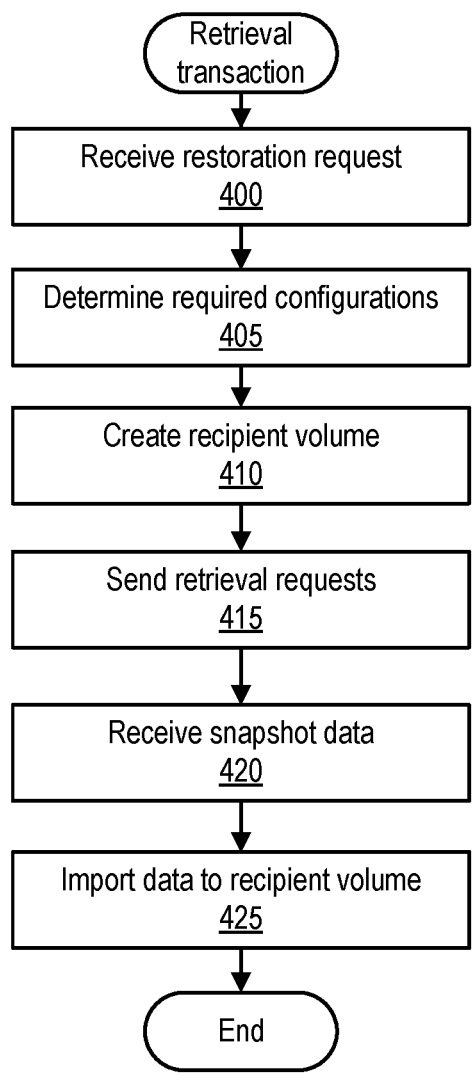
FIG. 4 is a high-level flowchart of process steps for retrieving a backup copy and recreating or importing a volume according to one embodiment.

The processes steps described below with respect to FIGS. 3A-4 illustrate various steps performed by an embodiment of a system for providing backup services for copies of data stored in block-level storage to computing instances supporting a group of distinct users. An embodiment of such a system provides backup copy functions for creating backup copies of data stored in the block-level storage by the computing instances for the distinct users, and for storing the backup copies in different destination locations specified by respective ones of the distinct users.

FIG. 3A is a high-level flowchart of process steps for creating and storing a snapshot according to one embodiment. User input specifying the destination for backup to a storage location (among other backup details) is received (block 300). In one embodiment, such user input is received from a web services interface, such as the web services interface 190 of FIG. 1. Details provided with the user input can include the number, frequency, size, or comprehensiveness of a snapshot or snapshot series requested to be created and stored at a particular location. Timing of a backup can also be included. Alternatively, such user input is received from a virtual machine, such as virtual machine 180 of FIG. 1. Specifications for the backup, which are extracted from the received details, are recorded to a configuration file (block 305), such as configuration file 252 of FIG. 2B. A backup copy is then created according to the specifications from the configuration file (block 310). In one embodiment, the backup copy is created by generating a snapshot of a volume through a backup creation module, such as backup creation module 276 of FIG. 2B. The backup is then stored to the location or locations specified in the configuration file (block 315). The process then ends.

FIG. 3B is a high-level flowchart of process steps for creating and storing a backup copy of a volume according to one embodiment. A snapshot is created in server block data storage (block 320). In one embodiment, server block data storage is provided by a block storage service, such as block storage service 265 of FIG. 2A. A storage configuration is determined by examining a configuration file (block 325), such as configuration file 252 of FIG. 2B. In one embodiment, the configuration includes information related to storage granularity, such as whether a snapshot is to be stored as whole snapshot images, files, chunks of data reflecting address ranges, or other formats. Other information, such as whether the backup is part of a series, whether the parts of the series are to be concentrated in a single storage location or spread among multiple storage information, whether the parts of a single backup copy are to be concentrated or distributed among multiple servers, what entities control various backup storage locations, and how the backup is to be authenticated and secured may also be determined. Storage system parameters for a storage destination are then ascertained (block 330). In one embodiment, storage system parameters include the format of APIs associated with a particular storage system, the location of a storage system at a particular storage destination, and information on whether a backup storage adapter or a block storage adapter is needed for communication with the storage destination. A storage transmission is executed (block 335). In the storage transmission, the snapshot is transmitted, in whole or in the specified component parts, to the storage destination. In some embodiments, confirmation of receipt is received (block 340). The process then ends.

FIG. 4 is a high-level flowchart of process steps for retrieving a volume snapshot and restoring a volume according to one embodiment. A restoration request is received (block 400). In one embodiment, such a restoration request is received from a web services interface, such as the web services interface 190 of FIG. 1. Details provided with the restoration request can include the importation location and destination (such as a particular virtual machine host) for the restoration. Timing of a restoration can also be included, such as a delay to perform the operation when idle machine cycles are available. Alternatively, such user input is received from a virtual machine, such as virtual machine 180 of FIG. 1. Required configurations for the restoration request are determined (block 405). In one embodiment, required configurations include parameters include the format of APIs associated with a particular storage system, the location of a storage system at a particular storage destination, and information on whether a backup storage adapter or a block storage adapter is needed for communication with the storage destination. A recipient volume is created (block 410). In one embodiment, the recipient volume is a blank volume into which received data will be stored. Retrieval requests are sent to the storage system hosting the volume (block 415). Snapshot data is received (block 420). In one embodiment, received data is stored as a complete snapshot on the block level storage that will host the recipient volume. Data is imported to the recipient volume (block 425). The process then ends.

The process of FIG. 4 is portrayed for the sake of clarity as a linear series of operations. Those skilled in the art will, in light of having read the present disclosure, however, discern that the operations of FIG. 4 may be performed in an iterative fashion in order to process multiple requests. As an example of operations that may be performed iteratively, the requesting, receiving and importing operations (415-425) may be performed in an iterative loop until all requested data is received. Embodiments providing such iterative performance do not depart from the scope of the current disclosure.

Further, some operations omitted for the sake of clarity from the discussion of FIG. 4 will be implemented as part of embodiments. As an example of operations omitted from FIG. 4 in the interest of clarity, one skilled in the art will realize, in light of having read the present disclosure, that the procedure of FIG. 4 may include receipt verification steps and may include the ability to select importation from alternative data sources in response to a failure to receive data from a selected source or in response to a suboptimal delay in receiving data from the source. Embodiments providing such additional operations do not depart from the scope of the current disclosure.

Storage Cases Illustrating Interactions with Backup Storage

FIGS. 5-8 portray various use cases for employment of an embodiment of a system for providing backup copies of data stored in block-level storage to computing instances supporting a group of distinct users and for providing retrieval and restoration services with respect to backup copies.

Figure 5:
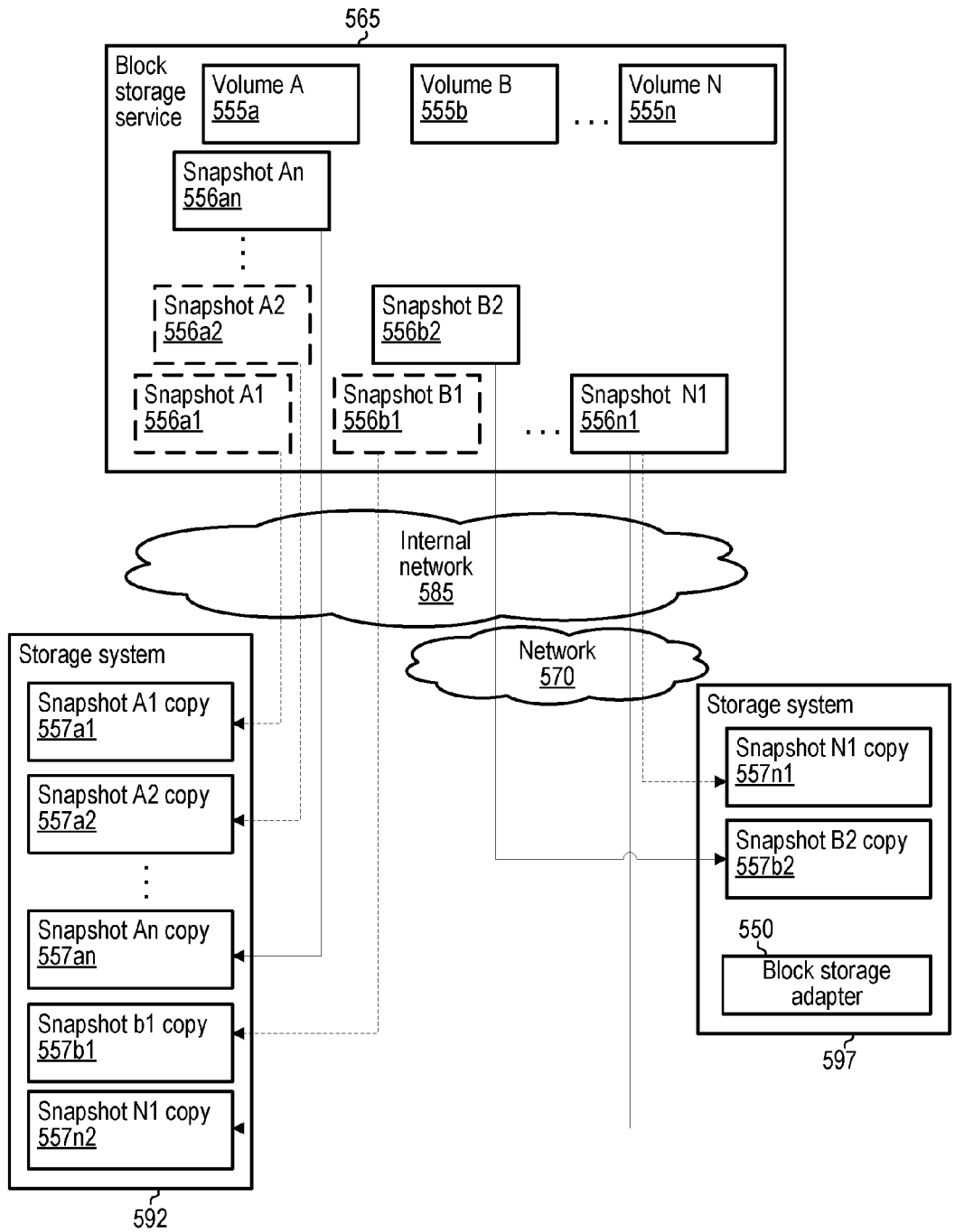
FIG. 5 is a high-level block diagram illustrating a series of storage interactions for storing a series of backup copies of volume snapshots according to one embodiment.

FIG. 5 is a high-level block diagram illustrating a series of storage interactions for storing a series of backup copies of volume snapshots according to one embodiment. Block storage service 565 stores a series of volumes 555a-555n, each of which is attached to one or more computing instances, and creates a set of snapshots 556a1-556an, 556b1-556b2, and 556n1. Storage system 592 stores snapshot copies 557a1-557an as well as snapshot copy 557b1 and snapshot copy 557n1. In one embodiment, snapshots 556a1-556an and snapshot copies 557a1-557an are incremental snapshots in which blocks are shared between snapshot copies. Thus, snapshot A1 556a1 and snapshot A1 copy 557a1 may contain a complete set of blocks necessary to restore volume A 556a. However, subsequent snapshot A2 556a2 and snapshot A2 copy 557a2 may contain only those blocks that have changed between the creation of snapshot A1 556a1 and the subsequent creation of snapshot A2 556a2. In such an embodiment, restoration of Volume A 555a from snapshot A2 copy 557a2 may use all of the blocks of snapshot A2 copy 557a2 and whatever blocks of snapshot A1 copy 557a1 have not changed between the creation of snapshot A1 556a1 and the subsequent creation of snapshot A2 556a2.

Storage system 592 is, in one embodiment, similar to local storage system 292 of FIG. 2A. Storage system 592 communicates with block storage service 565 using internal network 585. Similarly, storage system 597 stores snapshot copy 557n1 and snapshot copy 557b2. Storage system 597 is, in one embodiment, similar to storage system 297 of FIG. 2A. Storage system 597 communicates with block storage service 565 using network 570 and internal network 585. In one embodiment, a block storage adapter 550 provides the ability for storage system 597 to receive and respond to storage API calls from block storage system 565 using an API that is supported by storage system 597 while storage system 592 uses an API that is different from the API used by storage system 597 and is used by block storage service 565.

A series of snapshot copies, such as snapshot copies 557a1-557an stored on storage system 592 will, in one embodiment, result from input, such as a set of backup requests from user of a computing instance attached to one or more volumes supported by block storage service 565. Such a backup request can specify a particular destination, such as storage system 592, for storing all of a set of backup copies of data stored in volume A 555a on the block-level storage of block storage service 565. The series of snapshot copies portrayed as snapshot copies 557a1-557an results from a user requesting a series of whole volume snapshots, wherein each of snapshot copies 557a1-557an represents the complete state of volume A 555a at a particular point in time.

Responsive to such a request, block storage service 565, using a backup creation module such as backup creation module 276 of FIG. 2B (discussed above), creates snapshot A1 556a1 at a time $t_1$ and stores snapshot A1 copy 557a1 on storage system 592 over internal network 585 using a backup storage manager such as backup storage manager 282 of FIG. 2B. Snapshot copy A1 557a1 is thereby preserved as a backup copy of the state of volume A 555a at time $t_1$. In some embodiments, block storage service 565 then deletes or releases snapshot A1 556a1 to conserve space on block storage service 565.

Subsequently, at a time $t_2$, block storage service 565 creates snapshot A2 556a2 and stores snapshot A2 copy 557a2 on storage system 592 over internal network 585. Snapshot A2 copy 557a2 is thereby preserved as a backup copy of the state of volume A 555a at time $t_2$. In some embodiments, block storage service 565 then deletes or releases snapshot A2 556a2 to conserve space on block storage service 565.

Subsequently, at a time $t_n$, block storage service 565 creates snapshot An 556an and stores snapshot An copy 557an on storage system 592 over internal network 585. Snapshot An copy 557an is thereby preserved as a backup copy of the state of volume A 555a at time $t_n$. In some embodiments, block storage service 565 then deletes or releases snapshot An 556an to conserve space on block storage service 565. Thus the user request for a series of whole volume backup copies on storage system 592 is fulfilled by the creation and storage of snapshot copies 557a1-557an. Each of snapshot copies 557a1-557an represents the complete state of volume A 555a at a particular point in time.

Additionally, a series of snapshot copies, such as snapshot copy 557b1 stored on storage system 592 and snapshot copy 557b2 stored on storage system 597 will, in one embodiment, result from input, such as a backup request, from another user employing another computing instance supported by block storage service 565. Such a backup request can specify a group of destinations, such as storage system 592 and storage system 597, for storing alternating members of a set of backup copies of data stored in volume B 555b on the block-level storage of block storage service 565. The series of snapshot copies portrayed as snapshot copies 557b1-557b2 results from a user requesting a series of whole volume snapshots, wherein each of snapshot copies 557b1-557b2 represents the complete state of volume B 555b at a particular point in time. The creation of snapshot copies 557b1-557b2 thereby results in a backup copy set that alternates loading between to multiple destinations, e.g., storage system 592 and storage system 597.

Responsive to such a request, block storage service 565 creates snapshot B1 556b1 at a time $t_1$ and stores snapshot B1 copy 557b1 on storage system 592 over internal network 585. Snapshot B1 copy 557b1 is thereby preserved as a backup copy of the state of volume B 555b at time $t_1$. In some embodiments, block storage service 565 then deletes or releases snapshot B1 556b1 to conserve space on block storage service 565.

Subsequently, at a time $t_2$, block storage service 565 creates snapshot B2 556b2 and stores snapshot B2 copy 557b2 on storage system 597 over internal network 585 and network 570. Snapshot B2 copy 557b2 is thereby preserved as a backup copy of the state of volume B 555b at time $t_2$. In some embodiments, block storage service 565 then deletes or releases snapshot B2 556b2 to conserve space on block storage service 565. Thus the user request for a series of whole volume backup copies on storage system 592 and storage system 597 is fulfilled by the creation and storage of snapshot copies 557b1-557b2. Each of snapshot copies 557b1-557b2 represents the complete state of volume B 555b at a particular point in time.

Further, a series of snapshot copies, such as snapshot N1 copy 557n1 stored on storage system 597 and snapshot N2 copy 557n2 stored on storage system 592 will, in one embodiment, result from input, such as a backup request, from yet another user employing another computing instance supported by block storage service 565. Such a backup request can specify a group of destinations, such as storage system 592 and storage system 597, for storing duplicate members of a set of backup copies of data stored in volume N 555n on the block-level storage of block storage service 565. The series of duplicate snapshot copies portrayed as snapshot copies 557n1-557bn results from a user requesting a series of whole volume snapshots, wherein each of snapshot copies 557n1-557n2 represents the complete state of volume N 555n at the same point in time. The creation of snapshot copies 557n1-557n2 thereby results in a backup copy set that provides redundant availability between storage system 592 and storage system 597.

Responsive to such a request, block storage service 565 creates snapshot N1 556n1 at a time $t_1$ and stores snapshot N1 copy 557n1 on storage system 597 over internal network 585 and network 570. Snapshot copy N1 557n1 is thereby preserved as a backup copy of the state of volume N 555n at time $t_1$. Block storage service 565 then stores snapshot N1 copy 557n2 on storage system 592 over internal network 585. Snapshot N1 copy 557n2 is thereby preserved as a backup copy of the state of volume N 555n at time $t_1$. In some embodiments, block storage service 565 then deletes or releases snapshot N1 556n1 to conserve space on block storage service 565.

Figure 6:
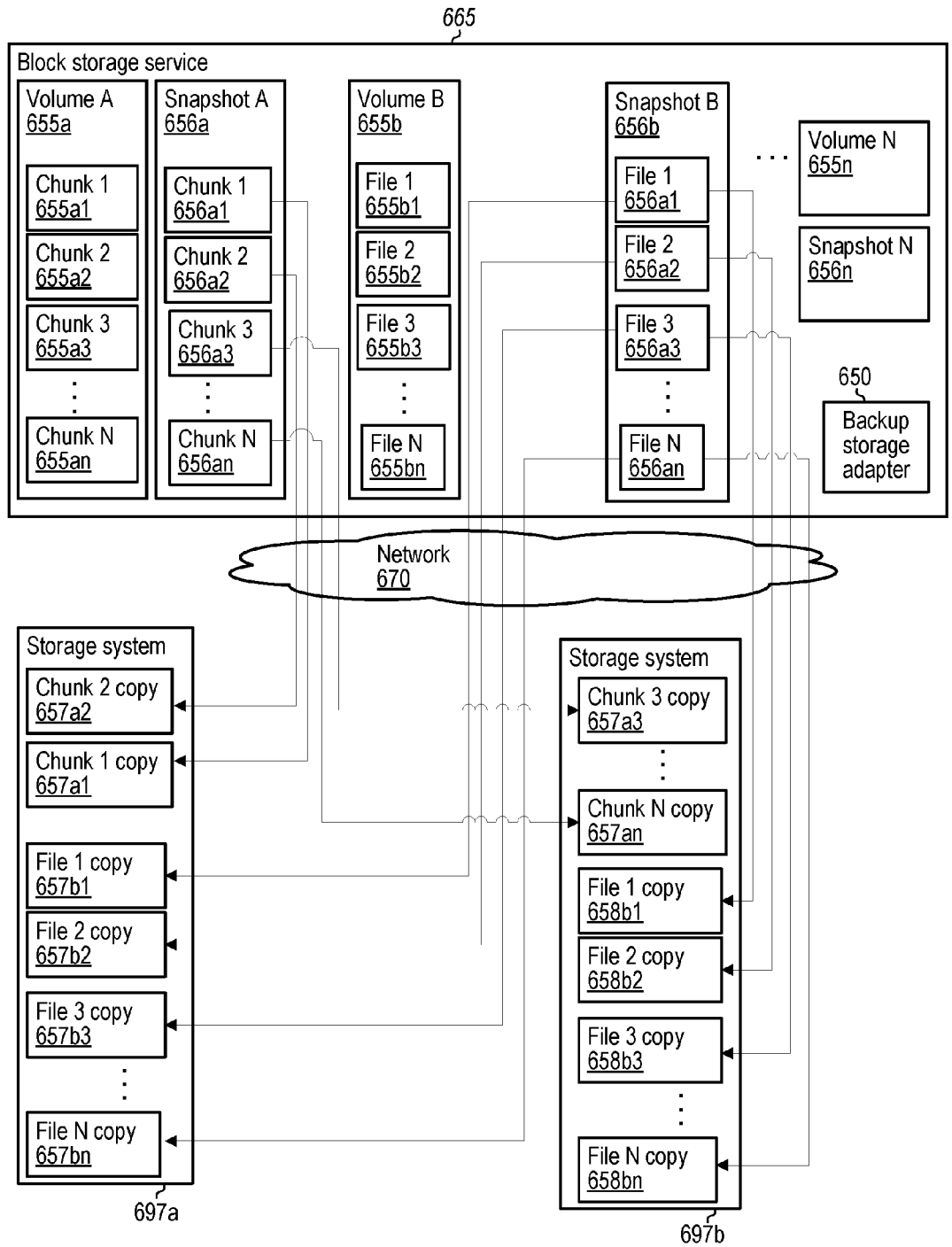
FIG. 6 is a high-level block diagram illustrating a series of storage interactions for storing a series of backup copies of volume portions according to one embodiment.

FIG. 6 is a high-level block diagram illustrating a series of storage interactions for storing a series of backup copies of volume portions according to one embodiment. A block storage service 665 stores a series of volumes 655a-655n and creates a set of snapshots 656a-656n. Volume A 655a is divided into chunks 655a1-655an and snapshot A 656a is divided into chunks 656a1-656an. Each of chunks 655a1-655an and chunks 656a-656n represents a subset of the data of volume A 655a, such as a fixed-size range of block storage addresses without any necessary logical correspondence between items of data stored in any particular chunks. Volume B 655b and snapshot B 656b, by contrast, are divided into files. Volume B 655b is divided into files 655b1-655bn and snapshot B 656b is divided into files 656b1-656bn. Each of files 655b1-655bn and files 656b1-656bn represents a logical subset of the data of volume B 655b.

Storage system 697a stores chunk copies 657a1-657a2 from snapshot 656a as well as file copies 657b1-657bn from snapshot 656b. Storage system 697a is, in one embodiment, similar to storage system 297 of FIG. 2A. Storage system 697a communicates with block storage service 665 using network 670. Similarly, storage system 697b stores chunk copies 657a3-657an from snapshot 656a and file copies 658b1-658bn from snapshot 656b. Storage system 697b is, in one embodiment, similar to storage system 297 of FIG. 2. Storage system 697b communicates with block storage service 665 using network 670. In one embodiment, a backup storage adapter 650 provides the ability for block storage service 665 to send requests as API calls to and receive responses to storage API calls from storage system 697a in a storage API format that is used by storage system 697a but is not used by storage service 665 without the presence of storage adapter 650. In one embodiment, storage system 697b and block storage service 665 can communicate using a common API format without the services of backup storage adapter 650. In an alternative embodiment, backup storage adapter 650 provides the ability for block storage service 665 to send requests as API calls to and receive responses to storage API calls from storage system 697b in a storage API format that is used by storage system 697b but is not used by storage service 665 without the presence of storage adapter 650. Storage system 697a and storage system 697b may be controlled by the same or different entities.

A series of chunk copies, such as chunk copies 657a1-657an stored on storage system 697a and storage system 697b will, in one embodiment, result from input, such as a backup request from a user of a computing instance attached to one or more volumes providing access to files or data chunks such as those supported by block storage service 665. Such a backup request can specify destinations, such as storage system 697a and storage system 697b, for storing respective ones of a set of backup copies of portions of data stored in volume A 655a on the block-level storage of block storage service 665. Chunk copies 657a1-657an result from a user requesting that parts of a snapshot, defined by block ranges, are distributed to multiple storage systems. Taken together, chunk copies 657*a*1-657*an* represent the complete snapshot of a state of volume A 655*a* at a particular point in time.

Responsive to such a request, block storage service 665 creates snapshot A 656*a* at a time $t_1$ and stores both chunks 657*a*1-657*a*2 on storage system 697*a* and chunks 657*a*3-657*an* on storage system 697*b*. Chunks 657*a*1-657*an* are thereby preserved as a backup copy of the state of volume A 655*a* at time $t_1$. In some embodiments, block storage service 665 then deletes or releases snapshot A 656*a* to conserve space on block storage service 665.

Additionally, a series of backup file copies, such as file copies 657*b*1-657*bn* stored on storage system 697*a* and file copies 658*b*1-658*bn* stored on storage system 697*b* will, in one embodiment, result from input, such as a backup request from a users of computing instances attached to one or more volumes supported by block storage service 665. Such a backup request can specify a group of destinations, such as storage system 697*a* and storage system 697*b*, for duplicate members of a set of backup copies of data stored in volume B 655*b* on the block-level storage of block storage service 665. The series of backup copies portrayed as file copies 657*b*1-657*bn* and file copies 658*b*1-658*bn* results from a user requesting the creation of a snapshot, wherein storage of each file within the snapshot is individually duplicated at two locations and both the set of file copies 657*b*1-657*bn* and the set of file copies 658*b*1-658*bn* represents the complete state of volume B 655*b* at a particular point in time. The creation of file copies 657*b*1-657*bn* and file copies 658*b*1-658*bn* thereby results in a backup copy set that provides redundant backup of volume B 655*b*.

Responsive to such a request, block storage service 665 creates snapshot B 656*b* at a time $t_1$ and stores file copies 657*b*1-657*bn* on storage system 697*a* over network 670. Block storage service 665 stores file copies 658*b*1-658*bn* on storage system 697*b* over network 670. File copies 657*b*1-657*bn* and file copies 658*b*1-658*bn* are thereby preserved as redundant backup copies of the state of volume B 655*b* at time $t_1$. In some embodiments, block storage service 665 then deletes or releases snapshot B 656*b* to conserve space on block storage service 665.

Figure 7:
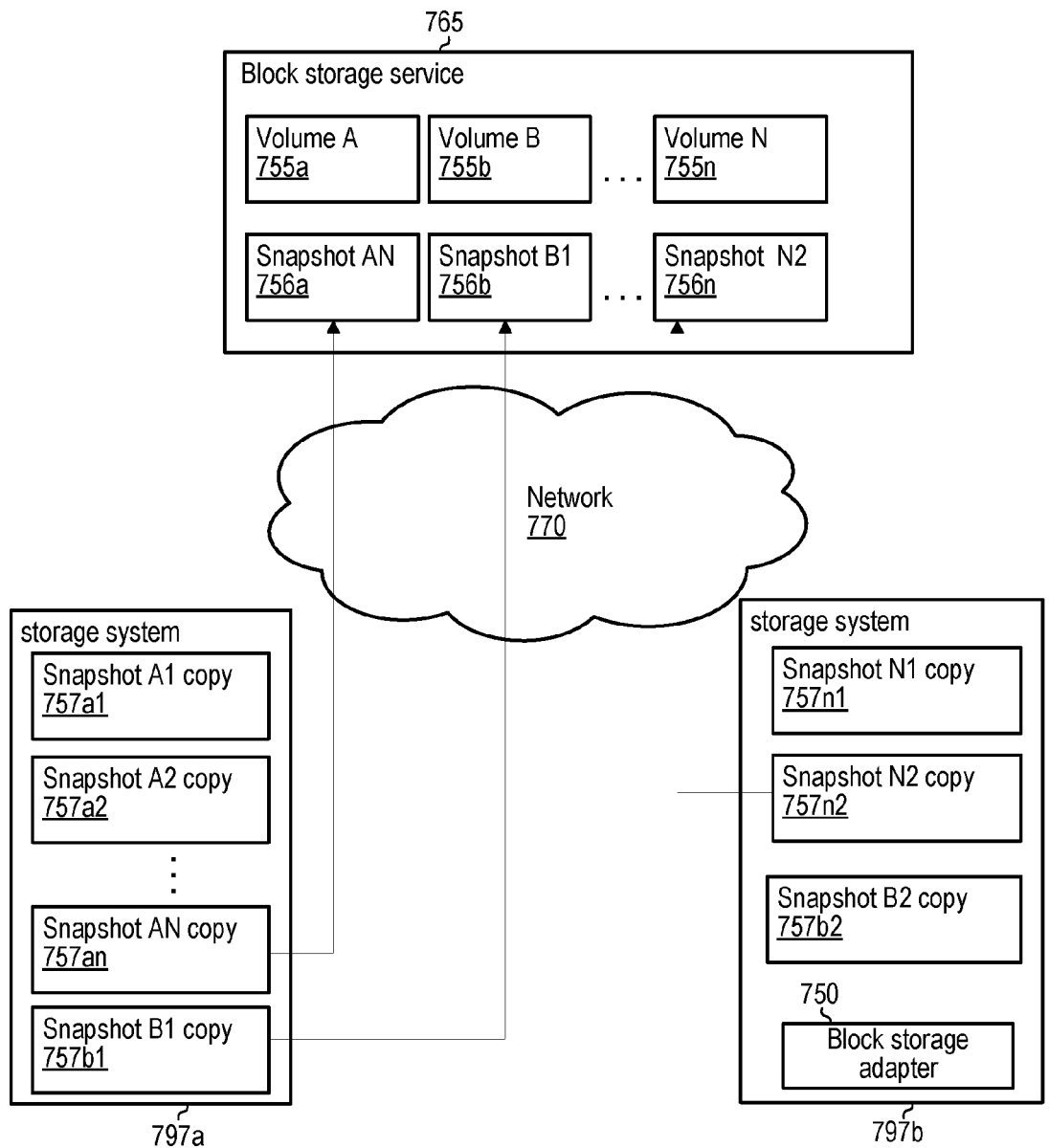
FIG. 7 is a high-level block diagram illustrating a series of storage interactions for restoring a series of volume snapshots according to one embodiment.

FIG. 7 is a high-level block diagram illustrating a series of storage interactions for restoring a series of volume snapshots according to one embodiment. A block storage service 765 communicates with a storage system 797*a* and a storage system 797*b* over a network 770. Storage system 797*a* is, in one embodiment, similar to storage system 297 of FIG. 2A. Storage system 797*a* holds snapshot copies 757*a*1-757*an*, each of which represents a complete state of a Volume A at a particular point in time. In one embodiment, snapshot copies 757*a*1-757*an* are created in a manner similar to that discussed above with respect to snapshot copies 557*a*1-557*an* of FIG. 5. Storage system 797*a* further holds snapshot B1 copy 757*b*1.

A user of a computing instance supported by block storage service 765 can request restoration of volume A from one of snapshot copies 757*a*1-757*an*, selecting a particular one of snapshot copies 757*a*1-757*an* based, for instance, on the point in time to which the user of the computing instance would like to see volume A restored. Responsive to such a request, block storage service 765 determines required configurations for creating volume A, such as the importation location of the preferred one of snapshot copies 757*a*1-757*an*, e.g., snapshot An copy 757*an*. Block storage service 765 creates an empty recipient volume, labeled as Volume A 755*a*. Block storage service 765 then sends retrieval requests to storage system 797*a*, requesting that the content of snapshot An copy 757*an* be sent to block storage service 765. In one embodiment, as content of snapshot An copy 757*an* is received on block storage service 765, content of snapshot copy 757*an* is deposited as snapshot AN 756*a* and then transferred to volume A 755*a*. In one embodiment, content received and transferred to volume A 755*a* may be made available and supplied to a user of a computing instance prior to completion of receipt of all data from snapshot copy 757*an* into snapshot AN 756*n*. Additionally, in one embodiment, storage system 797*a* and block storage system 765 can communicate using a shared API protocol.

Similarly, storage system 797*a* holds snapshot copy 757*b*1 and storage system 797*b* holds snapshot copy 757*b*2, each of which represents a complete state of a Volume B at a particular point in time. In one embodiment, snapshot copies 757*b*1-757*b*2 are created in a manner similar to that discussed above with respect to snapshot copies 557*b*1-557*b*2 of FIG. 5.

A user of a computing instance supported by block storage service 765 can request restoration of volume B from one of snapshot copies 757*b*1-757*b*2, selecting a particular one of snapshot copies 757*b*1-757*b*2 based, for instance, on the point in time to which the user of the computing instance would like to see volume B restored. Responsive to such a request, block storage service 765 determines required configurations for creating volume B, such as the importation location of an appropriate one of snapshot copies 757*b*1-757*b*2. Block storage service 765 creates an empty recipient volume, labeled as Volume B 755*b*. Block storage service 765 then sends retrieval requests to storage system 797*a*, requesting that the content of snapshot copy 757*b*1 be sent to block storage service 765. In one embodiment, as content of snapshot copy 757*b*1 is received on block storage service 765, content of snapshot copy 757*b*1 is deposited as snapshot B1 756*b* and then transferred to volume B 755*b*.

Additionally, storage system 797*b* holds snapshot copies 757*n*1-757*n*2, each of which represents a complete state of a Volume N at a particular point in time. In one embodiment, snapshot copies 757*n*1-757*n*2 are created in a manner similar to that discussed above with respect to snapshot copies 557*n*1-557*n*2 of FIG. 5.

A user of a computing instance supported by block storage service 765 can request restoration of volume N from one of snapshot copies 757*n*1-757*n*2, selecting a particular one of snapshot copies 757*n*1-757*n*2 based, for instance, on the point in time to which the user of the computing instance would like to see volume N restored. Responsive to such a request, block storage service 765 determines required configurations for creating volume N, such as the importation location of snapshot copies 757*n*1-757*n*2. Block storage service 765 creates an empty recipient volume, labeled as Volume N 755*n*. Block storage service 765 then sends retrieval requests to storage system 797*b*, requesting that the content of snapshot N2 copy 757*n*2 be sent to block storage service 765. In one embodiment, as content of snapshot N2 copy 757*n*2 is received on block storage service 765, content of snapshot copy 757*n*2 is deposited as snapshot N2 756*n* and then transferred to volume N 755*n*. In one embodiment, storage system 797*b* and block storage system 765 can communicate using a block storage adapter 760 to translate API requests formatted for a protocol used by block storage system 765 into API requests formatted for a protocol used by storage system 797*b*.

Figure 8:
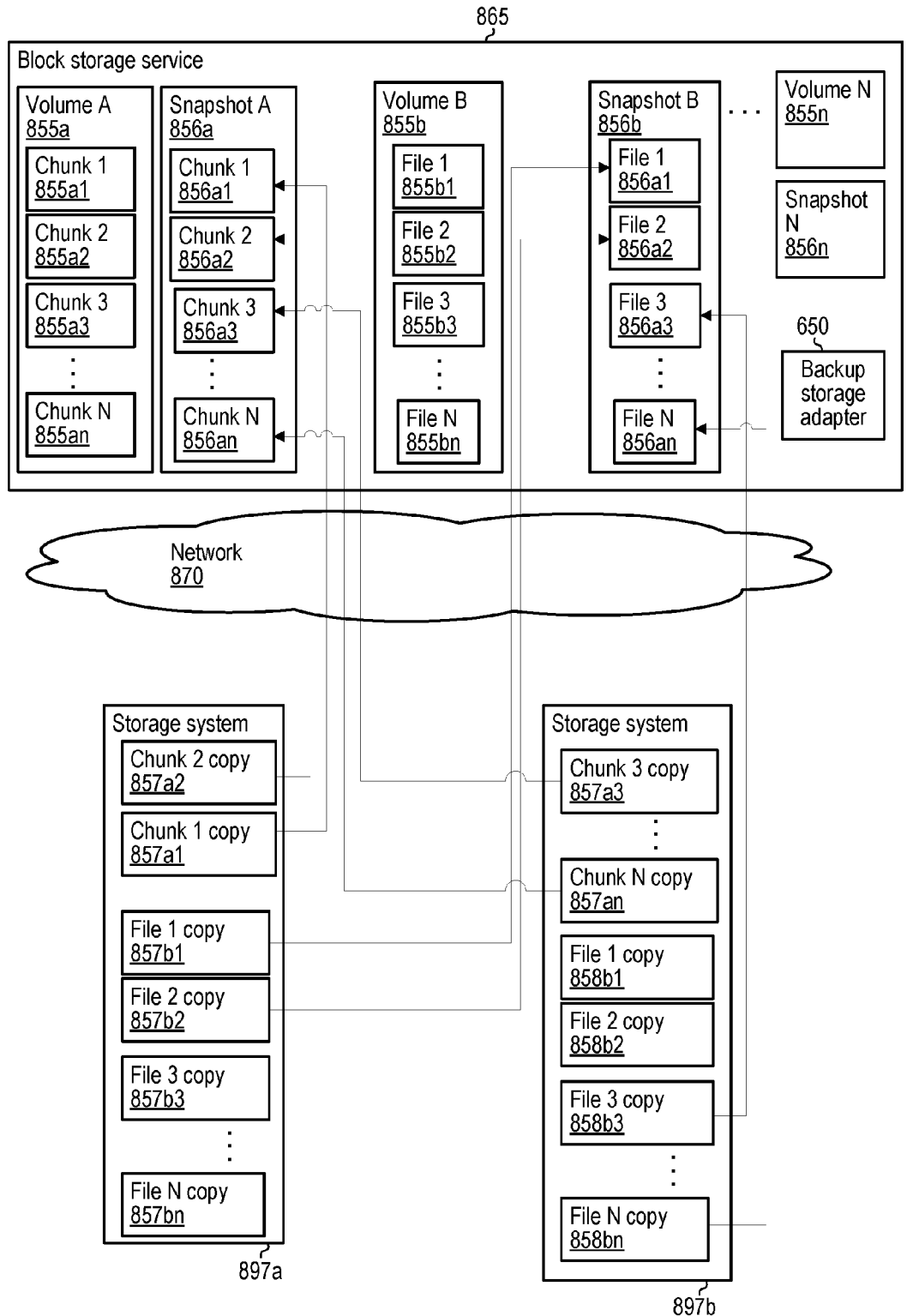
FIG. 8 is a high-level block diagram illustrating a series of storage interactions for restoring a volume from portion backup copies according to one embodiment.

FIG. 8 is a high-level block diagram illustrating a series of storage interactions for restoring a series of backup copies of volume portions according to one embodiment. A block storage service 865 communicates with a storage system 897*a* and a storage system 897*b* over a network 870. Storage system 897*a* is, in one embodiment, similar to storage system 297 of FIG. 2. Storage system 897*a* stores chunk copies 857*a*1-857*a*2 as well as file copies 857*b*1-857*bn*. Similarly, storage system 897*b* stores chunk copies 857*a*3-857*an* and file copies 858*b*1-858*bn*. Storage system 897*b* is, in one embodiment, similar to storage system 297 of FIG. 2. Storage system 897*b* communicates with block storage service 865 using network 870. In one embodiment, a backup storage adapter 850 provides the ability for block storage service 865 to send requests as API calls to and receive responses to storage API calls from storage system 897*a* in a storage API format that is used by storage system 897*a* but is not used by storage service 865 without the presence of storage adapter 850. In one embodiment, storage system 897*b* and block storage service 865 can communicate using a common API format without the services of backup storage adapter 850. In an alternative embodiment, backup storage adapter 850 provides the ability for block storage service 865 to send requests as API calls to and receive responses to storage API calls from storage system 897*b* in a storage API format that is used by storage system 897*b* but is not used by storage service 865 without the presence of storage adapter 850. Storage system 897*a* and storage system 897*b* may be controlled by the same or different entities.

A user of a computing instance supported by block storage service 865 can request restoration of volume A from a snapshot constructed from chunk copies 857*a*1-857*an*. Responsive to such a request, block storage service 865 determines required configurations for creating volume A, such as the importation location of chunk copies 857*a*1-857*an* on storage system 897*a* and storage system 897*b*. Block storage service 865 creates an empty recipient volume, labeled as Volume A 855*a*. Block storage service 865 then sends retrieval requests to storage system 897*a* and storage system 897*b*, requesting that the content of chunk copies 857*a*1-857*an* be sent to block storage service 865.

In one embodiment, as content of chunk copies 857*a*1-857*an* is received on block storage service 865, content of chunk copies 857*a*1-857*an* is deposited as snapshot A 856*a* containing chunks 856*a*1-856*an* and then transferred to volume A 855*a* as chunks 855*a*1-855*an*. In one embodiment, content received and transferred to volume A 855*a* may be made available and supplied to a user of a computing instance prior to completion of receipt of all data from chunk copies 857*a*1-857*an* into snapshot A 856A.

A user of a computing instance supported by block storage service 865 can request restoration of volume B 855*b* from snapshot B 856*b* constructed from file copies 857*b*1-857*bn* and 858*b*1-858*bn*. Responsive to such a request, block storage service 865 determines required configurations for creating volume B, such as the importation location of file copies 857*b*1-857*bn* and 858*b*1-858*bn* on storage system 897*a* and storage system 897*b*. In one embodiment, locations from which to import individual ones of file copies 857*b*1-857*bn* and 858*b*1-858*bn* can be chosen on the basis of distribution of loading to storage system 897*a* and storage system 897*b* or other criteria, such as server reliability or responsiveness.

Specifically, the ability to restore volume B 855*b* from snapshot B 856*b* constructed from file copies 857*b*1-857*bn* residing on storage system 897*a* and file copies 858*b*1-858*bn* residing on storage system 897*b* provides several forms of storage flexibility. For instance, if retrieval of file copies 857*b*1-857*bn* residing on storage system 897*a* becomes slowed or if storage system 897*a* become entirely non-responsive, importation of data for snapshot B 856*b* can be accelerated through retrieval of file copies 858*b*1-858*bn* residing on storage system 897*b*. Alternatively, the existence of both file copies 857*b*1-857*bn* residing on storage system 897*a* and file copies 858*b*1-858*bn* residing on storage system 897*b* may allow storage management in which file copies are initially created on a faster storage server and slowly copied to a slower server, eventually being deleted from the faster server over time, which may, in some embodiments, be measured from a time of last use or a time of creation. Similarly, embodiments, without departing from the scope of the present disclosure, execute multiple-copy chunk distribution analogous to the distribution and use of file copies 857*b*1-857*bn* residing on storage system 897*a* and file copies 858*b*1-858*bn* residing on storage system 897*b*.

Block storage service 865 creates an empty recipient volume, labeled as Volume B 855*b*. Block storage service 865 then sends retrieval requests to storage system 897*a* and storage system 897*b*, requesting that the content of selected ones of storage system 897*a* and storage system 897*b* be sent to block storage service 865.

In one embodiment, as content of the selected ones of file copies 857*b*1-857*bn* and 858*b*1-858*bn* is received on block storage service 865, content of the selected ones of file copies 857*b*1-857*bn* and 858*b*1-858*bn* is deposited as snapshot B 856*b* containing files 856*b*1-856*bn* and then transferred to volume B 855*b* as files 855*b*1-855*bn*. In one embodiment, content received and transferred to volume B 855*b* may be made available and supplied to a user of a computing instance prior to completion of receipt of all data from the selected ones of file copies 857*b*1-857*bn* and 858*b*1-858*bn* into snapshot B 856B.

Example Computer System Embodiment

It is contemplated that in some embodiments, any of the methods, techniques or components described above may be implemented as instructions and data capable of being stored or conveyed via a computer-accessible medium. Such methods or techniques may include, for example and without limitation, the various methods of a block storage service providing block-level storage to a set of distinct computing instances for a set of distinct users, in which embodiments provide both a backup copy function for creating backup copies of data stored in the block-level storage by the set of distinct computing instances for the set of distinct users and a storage function for storing the backup copies in different destination locations specified by respective ones of the set of distinct users, such as those performed by the elements and methods described above and shown in FIGS. 1-7, or suitable variations of such elements and methods. Such instructions may be executed to perform specific computational functions tailored to specific purposes (e.g., processing web services traffic, performing high-precision numerical arithmetic, etc.) as well as higher-order functions such as operating system functionality, virtualization functionality, network communications functionality, application functionality, and/or any other suitable functions.

Figure 9:
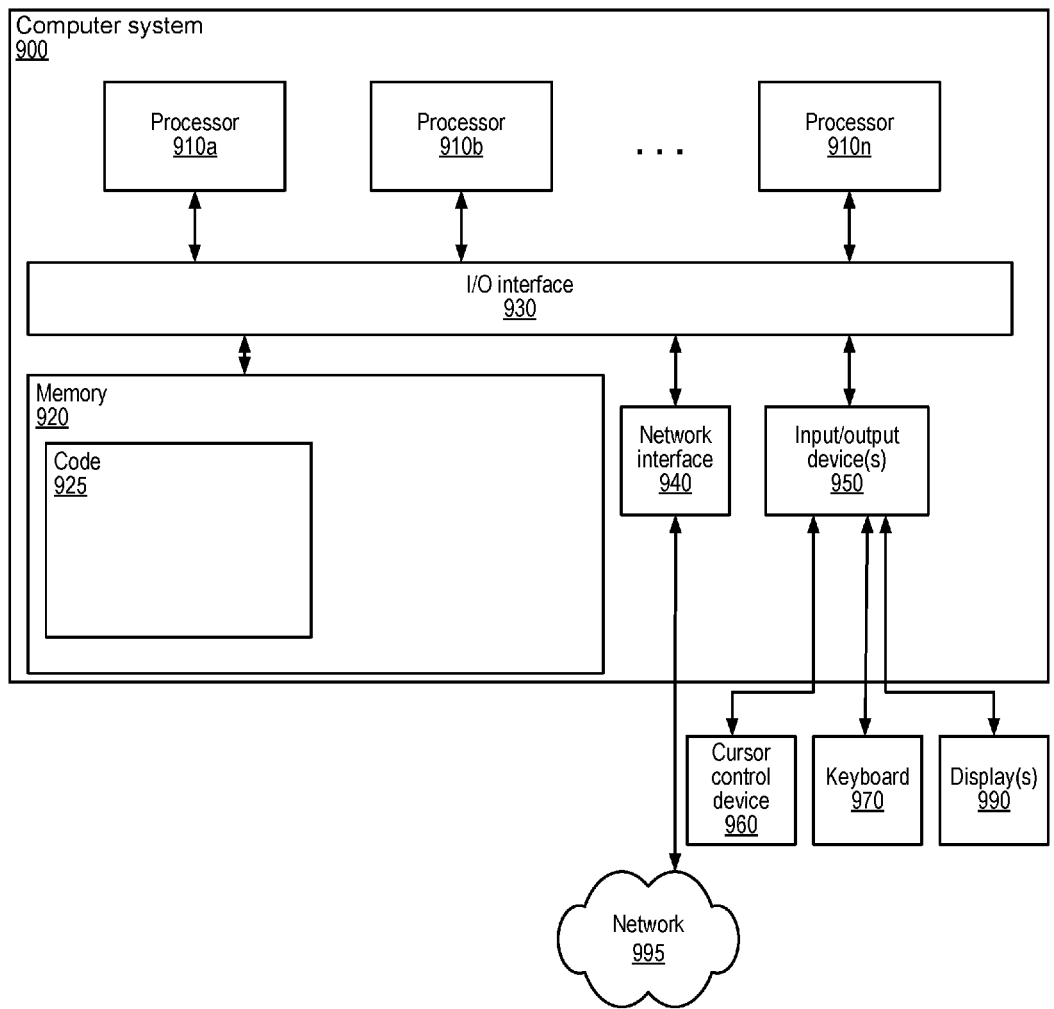
FIG. 9 is a high-level block diagram illustrating a configuration of computing system components suitable for implementing an embodiment.

One example embodiment of a computer system including computer-accessible media is illustrated in FIG. 9. Computer system 900 may correspond to an example configuration of physical computer system 100 shown in FIG. 1. Correspondingly, in various embodiments, the functionality of any of the various modules or methods described above (e.g., as provided by operating system 150, virtualization module 160, virtual machines 180, and/or other elements described above) may be implemented by one or several instances of computer system 900. Similarly, the various elements of data center 200, such as nodes 210, computing systems 230, block storage service 265, local storage systems 292, and other functional units of data center 200 may be implemented by one or several instances of computer system 900.

In particular, it is noted that different elements of the system shown in FIG. 1 may be implemented by different computer systems 900. For example, virtualization module 160 may be implemented on one computer system 900 while virtual machines 200 may execute on a different computer system 900 under the control of virtualization module 160. Similarly, each of several nodes 210 and several computing systems 230 may be implemented by different computer systems 900 while each of block storage service 265, remote storage systems 297 and local storage systems 292 may also be implemented by different computer systems 900. In varying computing system embodiments, individual computing systems will be constructed that will omit various of the parts show in FIG. 9 and include others omitted in FIG. 9.

In the illustrated embodiment, computer system 900 includes one or more processors 910 coupled to a system memory 920 via an input/output (I/O) interface 930. Computer system 900 further includes a network interface 940 coupled to I/O interface 930. In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 920 as code 925. It is noted that in some embodiments, code 925 may include instructions and data implementing desired functions that are not directly executable by processor 910 but are represented or encoded in an abstract form that is translatable to instructions that are directly executable by processor 910. For example, code 925 may include instructions specified in an ISA that may be emulated by processor 910, or by other code 925 executable on processor 910. Alternatively, code 925 may include instructions, procedures or statements implemented in an abstract programming language that may be compiled or interpreted in the course of execution. As non-limiting examples, code 925 may include code specified in a procedural or object-oriented programming language such as C or C++, a scripting language such as perl, a markup language such as HTML or XML, or any other suitable language.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to network 120, such as other computer systems, for example. In various embodiments, network interface 940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 920 may be one embodiment of a computer-accessible storage medium configured to store instructions and data as described above. However, in other embodiments, instructions and/or data may be received, sent or stored upon different types of computer-accessible storage media. Generally speaking, a computer-accessible storage medium may include storage media or memory media such as magnetic or optical media, e.g., disk or CD/DVD-ROM coupled to computer system 900 via I/O interface 930. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 900 as system memory 920 or another type of memory. A computer-accessible storage medium may generally be accessible via transmission media or signals such as electrical, electromagnetic, or digital signals, conveyed via a communication medium such as a network and/or a wireless link, such as may be implemented via network interface 940.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
   providing, by a block storage service, block-level storage to a plurality of distinct computing instances for a plurality of distinct users;
   providing, by the block storage service, a backup copy function for creating backup copies of data stored in said block-level storage by said plurality of distinct computing instances for said plurality of distinct users, and storing the backup copies in different destination locations specified by respective ones of said plurality of distinct users;

receiving, by the block storage service, input from a particular one of said plurality of distinct users specifying a particular destination for storing a backup copy of at least a portion of data stored in the block-level storage for said particular one of said plurality of distinct users;

creating the backup copy of the at least a portion of data stored in the block-level storage for said particular one of said plurality of distinct users and storing to the particular destination the backup copy of the at least a portion of data stored in the block-level storage for said particular one of said plurality of distinct users;

receiving, by the block storage service, input from another one of said plurality of distinct users specifying a different destination for storing a backup copy of at least a portion of data stored in the block-level storage for said another one of said plurality of distinct users;

creating the backup copy of the at least a portion of data stored in the block-level storage for said another one of said plurality of distinct users and storing to the different destination the backup copy of the at least a portion of data stored in the block-level storage for said another one of said plurality of distinct users; and wherein the particular destination is for a storage system operated by a same entity as the block storage service, and the different destination is for a storage system operated by a different entity.

2. The method of claim 1, further comprising receiving input from the particular user specifying the at least a portion of data for the backup copy as:
a block-level storage volume attached to one of said plurality of distinct computing instances for said particular user,
one or more files stored in the block-level storage, or
a range of data locations in the block-level storage.

3. The method of claim 1, wherein the at least a portion of data stored in the block-level storage for said particular user is a block-level storage volume attached to at least one of said plurality of distinct computing instances for said particular user, the method further comprising creating a point-in-time snapshot of said block-level storage volume, wherein said backup copy is a copy of the point-in-time snapshot.

4. The method of claim 1, further comprising:
receiving input from the particular user specifying at least one other destination for storing the backup copy; and
storing, by the block storage service, the backup copy to the at least one other destination in addition to the particular destination.

5. The method of claim 1, further comprising:
receiving input from the particular user specifying at least one other destination for storing a backup copy of another portion of data stored in the block-level storage for said particular user; and
storing, by the block storage service, the backup copy of the another portion of data to the other destination.

6. The method of claim 1, further comprising creating or restoring a storage volume for the particular user in the block-level storage, wherein said creating comprises retrieving said backup copy from said particular destination.

7. The method of claim 1, further comprising:
receiving, by the block storage service from the particular user of the plurality of distinct users, input specifying a particular importation location from which to retrieve a copy of a storage volume;
retrieving, by the block storage service, the copy from the particular importation location;
based on the copy, creating or restoring a block-level storage volume in block-level storage of the block storage service;
providing the block-level storage volume to the particular user of the plurality of distinct users;
repeating said receiving, said retrieving, said creating or restoring, and said providing for another snapshot copy from a different importation location for another one of the plurality of distinct users.

8. The method of claim 7, wherein the providing the block storage volume to the particular user of the plurality of distinct users further comprises providing the block storage volume to a computing instance for the particular user.

9. The method of claim 8, wherein the retrieving, by the block storage service, the copy from the particular importation location further comprises:
retrieving selected data from the particular importation location in response to a request received from the computing instance to read the selected data from the block-level storage volume; and
retrieving non-selected data from the particular importation location.

10. The method of claim 9, wherein the retrieving the non-selected data from the particular importation location further comprises retrieving the non-selected data from the particular importation location in an order determined to represent a pattern of expected requests.

11. The method of claim 9, wherein the providing the block-level storage volume to the computing instance further comprises providing the selected data prior to completion of the retrieving the non-selected data.

12. The method of claim 7, wherein the different importation location is from a different storage system distinct from the block storage service and distinct from a storage system for the particular importation location.

13. A system, comprising:
one or more computers configured to implement a block storage service, wherein the block storage service comprises:
a block-level storage for storing data for a plurality of distinct users;
an interface configured to allow said plurality of distinct users to specify respective destinations for storing backup copies of respective data stored in the block-level storage for said plurality of distinct users, wherein one of the respective destinations is for a storage system operated by a same entity as the block storage service, and wherein another one of the respective destinations is for a storage system operated by a different entity than the block storage service;
a backup copy function for creating backup copies of data stored in said block-level storage for said plurality of distinct users, and storing the backup copies to different destination locations specified said plurality of distinct users via said interface.

14. The system of claim 13, wherein the block-level storage stores one or more block-level storage volumes each attached to at least one of a plurality of distinct computing instances, and wherein the block storage service is further configured to create point-in-time snapshots of the one or more block-level storage volumes, wherein said backup copies are copies of the point-in-time snapshots.

15. The system of claim 13, wherein said interface is further configured to allow a given one of said plurality of distinct users to specify multiple distinct destinations for storing backup copies of data stored for said given one of said plurality of distinct users in said block-level storage.

16. The system of claim 13, wherein the respective destinations require different interfaces for storing data, and wherein said block storage service is configured to store the backup copies to the respective destinations according to the different interfaces.

17. The system of claim 16, wherein the block storage service is further configured to receive from said particular user a pluggable module for storing data to the particular destination, wherein said pluggable module performs storage operations according to a particular interface required for the particular destination.

18. A non-transitory computer-readable storage medium storing program instructions that when executed on one or more computers implement:
 a block-level storage for storing data for a plurality of distinct users;
 an interface configured to allow said plurality of distinct users to specify respective destinations for storing backup copies of respective data stored in the block-level storage for said plurality of distinct users, wherein one of the respective destinations is for a storage system operated by a same entity as the block storage service, and wherein another one of the respective destinations is for a storage system operated by a different entity than the block storage service;
 a backup copy function for creating backup copies of data stored in said block-level storage for said plurality of distinct users, and storing the backup copies to different destination locations specified said plurality of distinct users via said interface.

19. The non-transitory computer-readable storage of claim 18, wherein the block-level storage stores one or more block-level storage volumes each attached to at least one of a plurality of distinct computing instances, and wherein the block storage service is further configured to create point-in-time snapshots of the one or more block-level storage volumes, wherein said backup copies are copies of the point-in-time snapshots.

20. The non-transitory computer-readable storage of claim 18, wherein said interface is further configured to allow a given one of said plurality of distinct users to specify multiple distinct destinations for storing backup copies of data stored for said given one of said plurality of distinct users in said block-level storage.

* * * * *